United States Patent
Yamamoto et al.

[11] Patent Number: 5,845,222
[45] Date of Patent: Dec. 1, 1998

[54] VEHICLE STEERING CONTROL SYSTEM

[75] Inventors: Yorihisa Yamamoto; Yutaka Nishi; Takashi Nishimori; Hiroyuki Tokunaga; Hideki Machino, all of Saitama, Japan

[73] Assignee: Honda Giken Kogyo Kabushiki Kaisha, Tokyo, Japan

[21] Appl. No.: 525,845

[22] Filed: Sep. 8, 1995

[30] Foreign Application Priority Data

Oct. 4, 1994 [JP] Japan ................................ 6-264593

[51] Int. Cl.$^6$ ........................................... G06G 7/70
[52] U.S. Cl. ............................... 701/41; 701/42; 701/36; 180/446; 180/422
[58] Field of Search ................ 364/424.051, 424.054, 364/424.052, 424.058, 423.096, 426.015, 426.016, 426.037, 426.025, 424.049, 450; 180/442, 446, 402, 415, 417, 443, 421, 422, 427, 429, 197, 246, 65.1; 280/735

[56] References Cited

U.S. PATENT DOCUMENTS

| | | | |
|---|---|---|---|
| 4,830,127 | 5/1989 | Ito et al. ............................ | 364/424.052 |
| 5,078,226 | 1/1992 | Inagaki et al. .................... | 364/424.051 |
| 5,247,441 | 9/1993 | Serizawa et al. ................. | 364/424.051 |
| 5,333,058 | 7/1994 | Shiraishi et al. .................. | 364/426.016 |
| 5,347,458 | 9/1994 | Serizawa et al. ................. | 364/424.051 |
| 5,388,658 | 2/1995 | Ando et al. ....................... | 364/426.037 |
| 5,446,660 | 8/1995 | Miichi et al. ..................... | 364/424.054 |
| 5,448,482 | 9/1995 | Yamamoto et al. .............. | 364/424.051 |
| 5,481,457 | 1/1996 | Yamamoto et al. .............. | 364/424.051 |
| 5,513,720 | 5/1996 | Yamamoto et al. .............. | 180/141 |
| 5,528,497 | 6/1996 | Yamamoto et al. .............. | 364/424.051 |

FOREIGN PATENT DOCUMENTS

2279304  4/1995  United Kingdom .

*Primary Examiner*—Jacques H. Louis-Jacques
*Attorney, Agent, or Firm*—Carrier, Blackman & Associates, P.C.; Joseph P. Carrier; William D. Blackman

[57] ABSTRACT

In a vehicle steering control system, an actuating torque is applied to steerable wheels according to a steering torque applied to a steering wheel in a conventional manner, and an additional actuating torque is applied to the steering wheel by an electric motor according to lateral dynamic conditions of the vehicle so as to control the lateral stability of the vehicle even in the presence of external interferences such as crosswind. Such external interferences are detected as a lateral dynamic condition of the vehicle such as the yaw rate of the vehicle, and the steering control system produces a steering reaction which counteracts such a lateral dynamic condition by applying the additional actuating torque to the steerable wheels so that the vehicle may maintain a straight course in spite of such external interferences without requiring any intentional efforts by the vehicle operator. A torque steer arising from the drive force applied to power driven steerable wheels can be also controlled as one form of external disturbances. In particular, by amplifying the steering reaction torque when the drive force is great, it is possible to favorably control the influences of a torque steer under any operation conditions.

9 Claims, 10 Drawing Sheets

VEHICLE STEERING CONTROL SYSTEM

TECHNICAL FIELD

The present invention relates to a vehicle steering control system for a vehicle equipped with steerable wheels that are power driven, and in particular to a steering control system which is capable of producing a steering torque that tends to correct the undesired behavior of the vehicle when the vehicle is subjected to torque steer, crosswind or other external interferences.

BACKGROUND OF THE INVENTION

In front wheel drive vehicles and four wheel drive vehicles having steerable wheels that are power driven, the steerable wheels tend to be spontaneously steered in either direction when the vehicle starts off or accelerates, whereby the vehicle may demonstrate a behavior which the vehicle operator may not anticipate. This is called "torque steer", and occurs, for instance, due to the asymmetric arrangement of the axle of the steerable wheels. When the vehicle experiences torque steer, the vehicle operator is required to apply a steering torque which opposes the torque steer to maintain the vehicle on a straight course.

It was previously proposed in the copending patent application Ser. No. 08/122,615 filed Sep. 16, 1993 to pre-define a reference yaw response model which gives rise to a reference yaw rate according to the steering angle, and other optional factors, and to determine the actual steering torque that is to be produced by the electric motor of the power steering system according to the deviation of the actual yaw rate from the reference yaw rate that is expected from the actual steering input. The contents of this copending application are hereby incorporated in the present application by reference. This previously proposed steering control system would respond to a torque steer as it would to any external disturbance, and could apply a steering reaction torque to the steerable wheels so as to cancel the effect of the torque steer.

However, this previously proposed steering control system is made relatively insensitive to the detected yaw rate in low speed ranges because the steering reaction torque produced by the control system in response to a yaw rate would otherwise unduly increase the effort required by the vehicle operator to steer the vehicle in low speed ranges. In low speed ranges, it is essential that the effort required to steer the vehicle be minimized, and that the vehicle operator be able to handle the vehicle in a limited space without much effort. Therefore, this previously proposed steering control system is not adequate to counteract the torque steer which arises when the vehicle accelerates from a standstill condition. In short, it has not been possible to achieve both the effective control of torque steer and the favorable maneuverability in low speed ranges.

The yaw rate resulting from the torque steer that is produced when the vehicle is accelerating from an intermediate speed range is relatively large when compared to the yaw rate typically produced by external disturbances such as crosswind. Therefore, the previously proposed steering control system which is designed to cancel the effect of such external disturbances also cannot adequately control the torque steer in intermediate speed ranges.

BRIEF SUMMARY OF THE INVENTION

In view of such limitations and shortcomings of the previously proposed vehicle steering control system, a primary object of the present invention is to provide an improved vehicle steering control system which is provided with a function to cancel the influences of external disturbances such as crosswind while also favorably controlling the torque steer of the vehicle.

A second object of the present invention is to provide a vehicle steering control system which can favorably control the torque steer of the vehicle without compromising its capability to stabilize the vehicle against external disturbances such as crosswind.

A third object of the present invention is to provide a vehicle steering control system which can favorably control the torque steer of the vehicle in all speed ranges.

According to the present invention, these and other objects can be accomplished by providing a vehicle steering control system for a vehicle equipped with steerable wheels that are power driven, comprising: manual steering torque input means for manually applying a manual steering torque to the steerable wheels; powered steering actuator means for applying an actuating steering torque to the steerable wheels; a yaw rate sensor for detecting a yaw rate of the vehicle; drive force computing means for computing a drive force of the power driven steerable wheels; control means for determining a steering reaction torque that is to be added to the actuating torque produced by the powered steering actuator means, according to the detected yaw rate; and modifying means for modifying the steering reaction torque that is determined by the control means according to the drive force computed by the drive force computing means; whereby a torque steer produced in the vehicle by the drive force of the power driven steerable wheels is controlled by the steering reaction torque which is determined by the control means and modified by the modifying means.

Thus, a torque steer arising from the drive force applied to power driven steerable wheels can be also controlled as one form of many possible external disturbances. In particular, by amplifying the steering reaction torque when the drive force is great, it is possible to favorably control the influences of a torque steer under any operating conditions. For instance, the modifying means may maintain the steering reaction torque determined by the control means substantially unchanged when the drive force is relatively small, and amplify the steering reaction torque determined by the control means when the drive force is relatively great.

According to a preferred embodiment of the present invention, the actuating steering torque comprises an assist steering torque which is substantially proportional to the manual steering torque, and the steering reaction torque which acts against external disturbances, the steering reaction torque being determined to cancel the detected actual yaw rate. Further, the steering reaction torque may consist of a sum of a first term which is substantially proportional to an actual yaw rate detected by the yaw rate sensor, and a second term which is substantially proportional to a steering speed, the steering reaction torque being directed to oppose the turning of a steering wheel.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
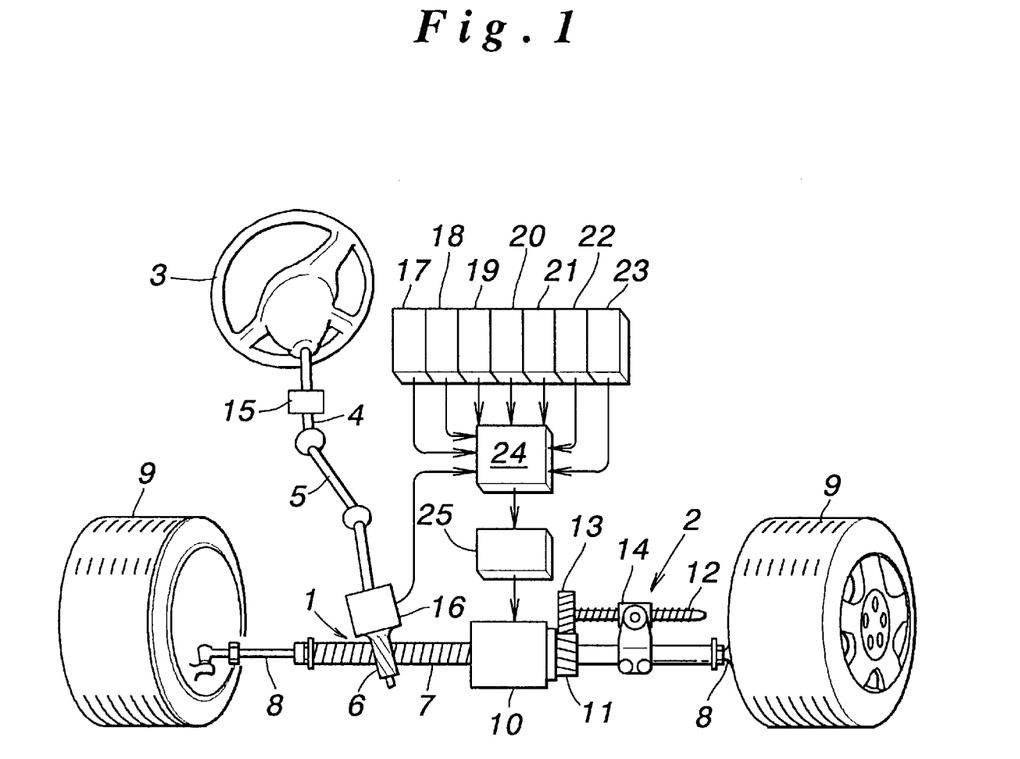
FIG. 1 is a schematic diagram generally illustrating a vehicle steering control system according to the present invention.

FIG. 1 shows the general structure of the vehicle steering system according to the present invention. This device comprises a manual steering force generating unit 1 and an assisting steering force generating unit 2 powered by an electric motor. A steering shaft 4 integrally connected to a steering wheel 3 is connected, at its lower end, to a pinion 6 of a rack and pinion mechanism via a universal joint 5. The rack and pinion mechanism further comprises a rack 7 which can move laterally of the vehicle body and meshes with the pinion 6. The two ends of the rack 7 are connected to the knuckle arms of the right and left front wheels 9 via tie rods 8, respectively. So far the structure is conventional, and the normal steering action based on the use of the rack and pinion mechanism can be accomplished.

The rack 7 is coaxially passed through an electric motor 10. More specifically, the rack 7 is passed through a hollow rotor having a drive helical gear 11 which meshes with a driven helical gear 13 mounted to an axial end of a screw shaft 12 of a ball screw mechanism extending in parallel with the rack 7. A nut 14 of the ball screw mechanism is fixedly secured to the rack 7.

The steering shaft 4 is provided with a steering angle sensor 15 for producing a signal corresponding to the rotational angle of the steering wheel 3 and a torque sensor 16 for producing a signal corresponding to a steering torque applied to the steering shaft 4. The vehicle body carries a lateral acceleration sensor 17 for producing a signal corresponding to the lateral acceleration applied to the vehicle body, a yaw rate sensor 18 for producing a signal corresponding to the yaw rate (angular speed of the yawing movement) of the vehicle body, a vehicle speed sensor 19 for producing a signal corresponding to the traveling speed of the vehicle, a fore-and-aft acceleration sensor 20 for producing a signal corresponding to the acceleration of the vehicle body in the fore-and-aft direction, a throttle sensor 21 for producing a signal corresponding to an opening angle of a throttle valve (or, alternatively, intake vacuum) of the engine, an engine rotational speed sensor 22 for producing a signal corresponding to a rotational speed of the engine, and a shift position sensor 23 for producing a signal corresponding to the shift position of the transmission device.

In this embodiment, the steering wheel 3 and the steerable wheels or the front wheels 9 are mechanically connected to each other, and a control signal obtained by processing the outputs from the various sensors 15 through 23 is supplied to the electric motor 10 via a control unit 24 and a drive circuit 25 so that the output torque of the electric motor 10 may be controlled as required.

Figure 2:
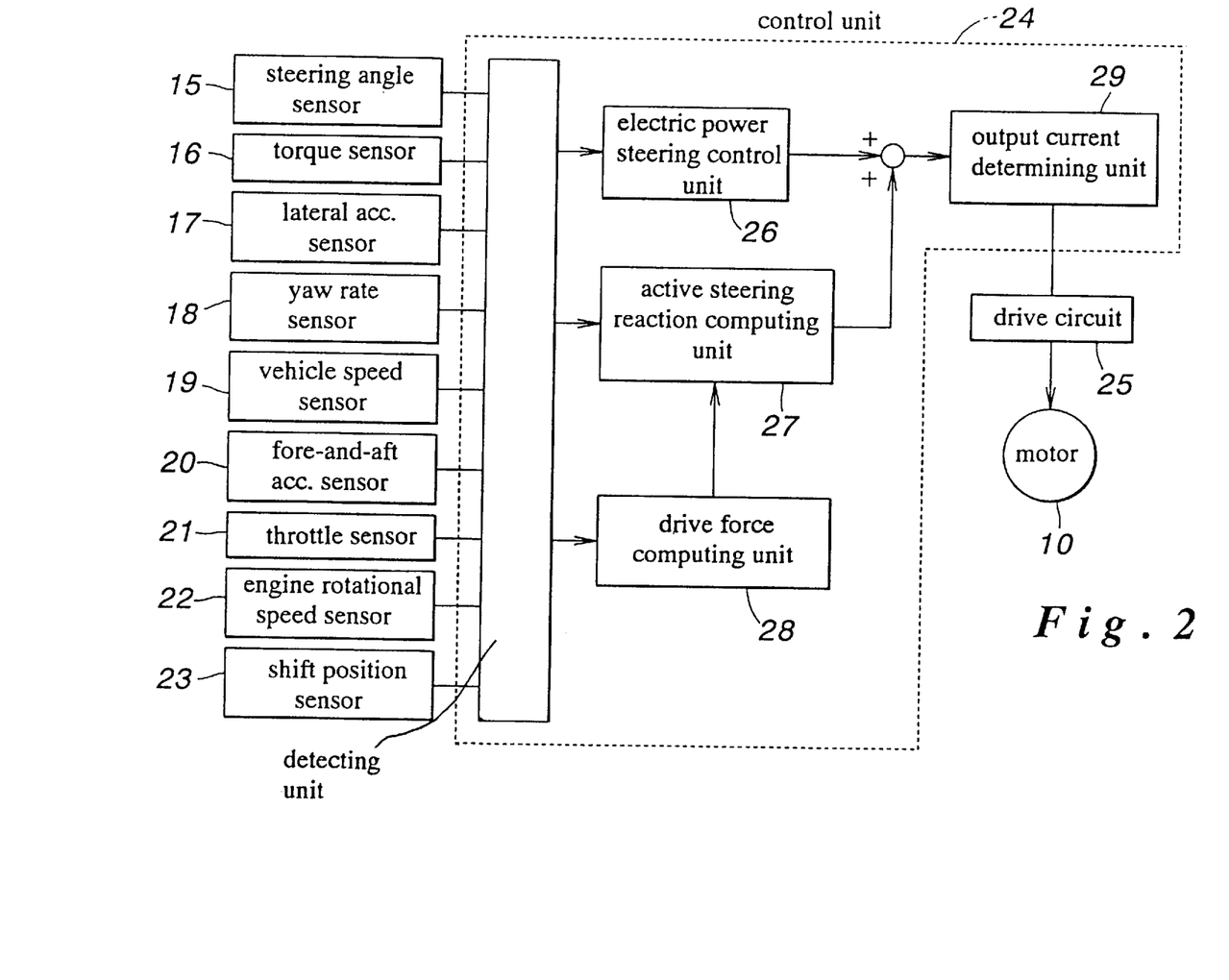
FIG. 2 is a block diagram showing the general structure of the vehicle steering control system.

FIG. 2 shows a schematic block diagram of a control system to which the present invention is applied. The control unit 24 receives the outputs from the steering angle sensor 15, the steering torque sensor 16, the lateral acceleration sensor 17, the yaw rate sensor 18, the vehicle speed sensor 19, the fore-and-aft acceleration sensor 20, the throttle sensor 21, the engine rotational speed sensor 22, and the shift position sensor 23. These output signals are fed to an electric power steering control unit 26, an active steering reaction computing unit 27, and a drive force computing unit 28, and the outputs from these units are supplied to an output current determining unit 29 so that a target electric current level for the electric motor 10 may be determined.

The electric power steering control unit 26 carries out the control for the normal power assist for the steering force or the actuating torque for the steerable front wheels 9. This control unit 26 may be optionally capable of also determining the target actuating torque according to the lateral acceleration and the yaw rate.

The active steering reaction computing unit 27 computes the target actuating torque according to the output signals from the various sensors 15 to 23, and an algorithm which is described hereinafter. The output current determining unit 29 determines the target driving current signal which is proportional or otherwise corresponds to the deviation of the actual steering torque obtained from the torque sensor 16 from the target steering torque value. The target driving current signal is however opposite in sign to the deviation.

The target drive current value thus obtained is supplied to the drive circuit 25. This drive circuit 25 controls the electric motor 10, for instance by PWM control, and an actually detected current value obtained from a current detection sensor is fed back to the input signal to the drive circuit 25 or the target drive current value.

Figure 3:
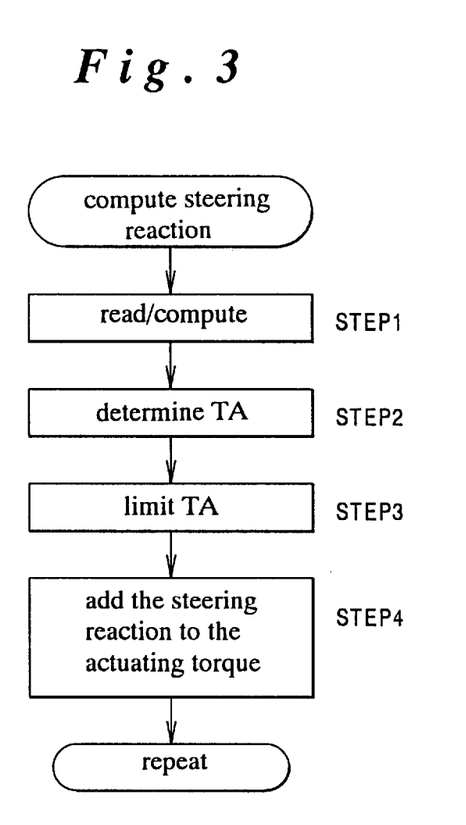
FIG. 3 is a flow chart showing the main control flow of the vehicle steering control system.

In the active steering reaction computing unit 27 in the control unit 24, the process shown by the flow chart of FIG. 3 is cyclically executed at a prescribed period. First of all, in step 1, the output signals from the various sensors, and the drive force value computed by the drive force computing unit 28 are read out, and the steering angular speed is computed. In step 2, the steering reaction TA is determined. A limit is set on the target steering reaction in step 3, and this control signal is added to the output of the electric power steering control unit 26 in step 4.

Figure 4:
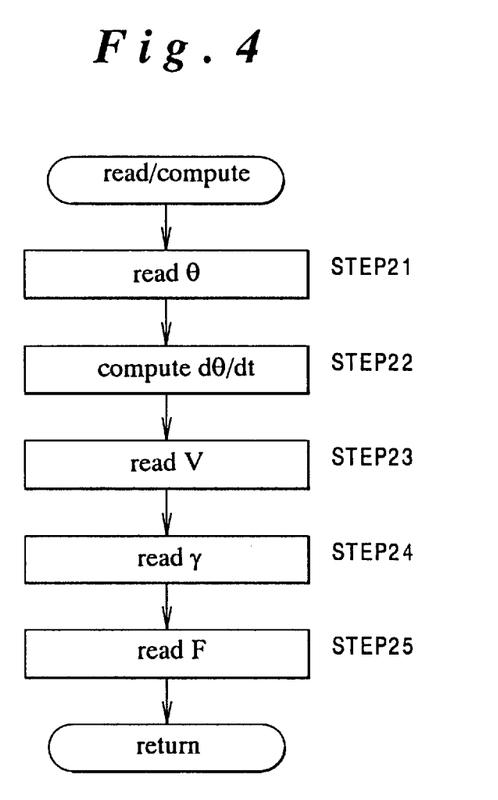
FIG. 4 is a flow chart showing step 1 of FIG. 3 in more detail.

This control process is described in more detail with reference to FIGS. 4 through 7. With reference to FIG. 4, step 1 includes the following sub steps. First of all, the steering angle θ is read (step 21), and the steering angular velocity dθ/dt is computed by differentiating the steering angle θ with time (step 22). Then, the vehicle speed V, the yaw rate γ, and the drive force F are read in steps 23, 24 and 25, respectively. The drive force F is computed from the slip of the power driven wheels based on the traveling speed of the vehicle obtained from the rotational speed of the non-driven wheels and the rotational speed of the driven wheels, the engine output torque obtained from the rotational speed of the engine and the throttle opening, the wheel torque computed from the shift position, and the fore-and-aft acceleration.

Figure 5:
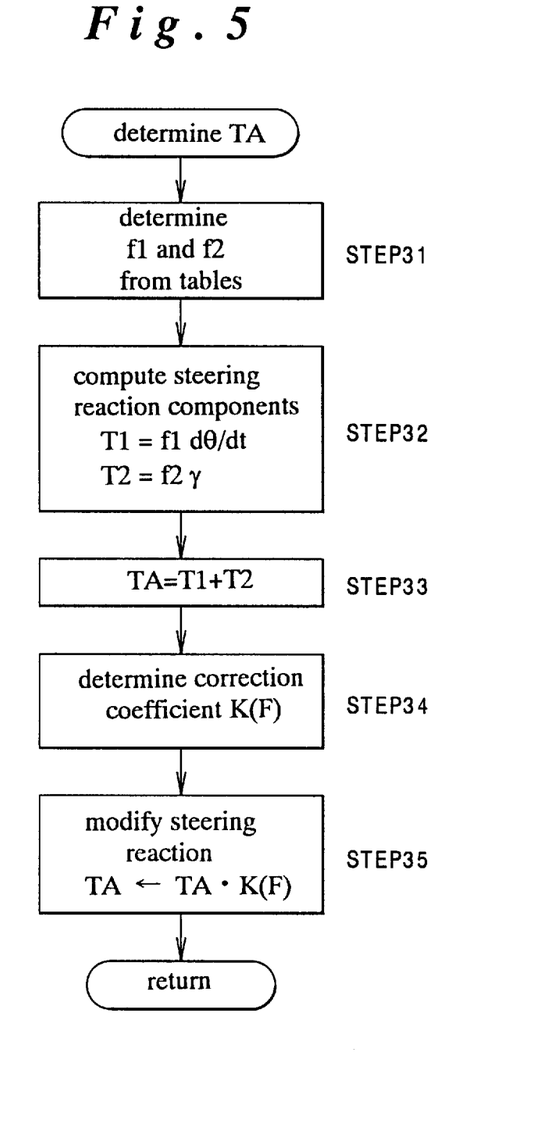
FIG. 5 is a flow chart showing step 2 of FIG. 3 in more detail.
Figure 9:
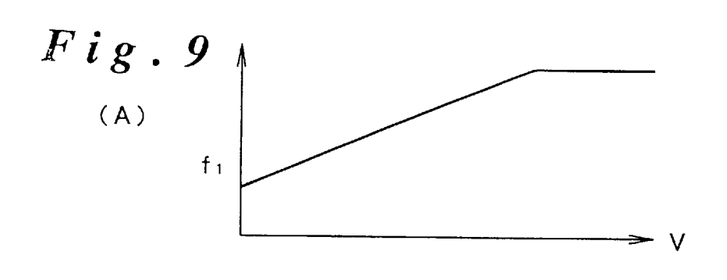
FIGS. 9A and 9B show graphs representing the dependence of the weighting functions f1 and f2 on the vehicle speed V.
Figure 10:
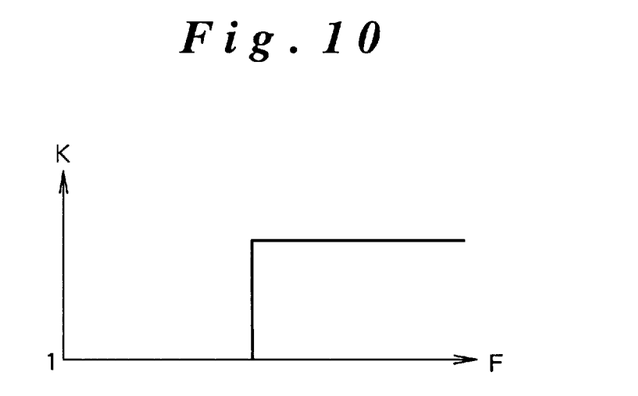
FIG. 10 is a graph showing the relationship between the correction coefficient K and the magnitude of the drive force F of the steerable wheels.

With reference to FIG. 5, step 2 includes the following sub steps. Coefficients f1 and f2 are weighting functions for the steering speed dθ/dt, and the actual yaw rate γ, and are obtained from data tables using the vehicle speed V as the address as illustrated in FIG. 9 (step 31). The steering reaction components T1 and T2 are computed from these variables and the corresponding coefficients (step 32), and the target steering reaction TA is computed by adding up these components (step 33). The weighting coefficients f1 and f2 for the steering speed dθ/dt and the yaw rate γ each consist of a linear function which progressively increases with the vehicle speed, and assumes a constant value beyond a certain vehicle speed (The weighting coefficient f2 is zero when V=0, but f1 takes a small value when V=0). This accounts for the fact that the influences of external disturbances increase with the vehicle speed V, and it is appropriate to increase the weighting coefficients f1 and f2 with the vehicle speed so as to offset this tendency. Then, a correction coefficient K(F) is obtained from a data table using the drive force F as the address as shown in FIG. 10 (step 34), and the target steering reaction TA is appropriately modified by the correction coefficient K(F) (step 35).

Figure 6:
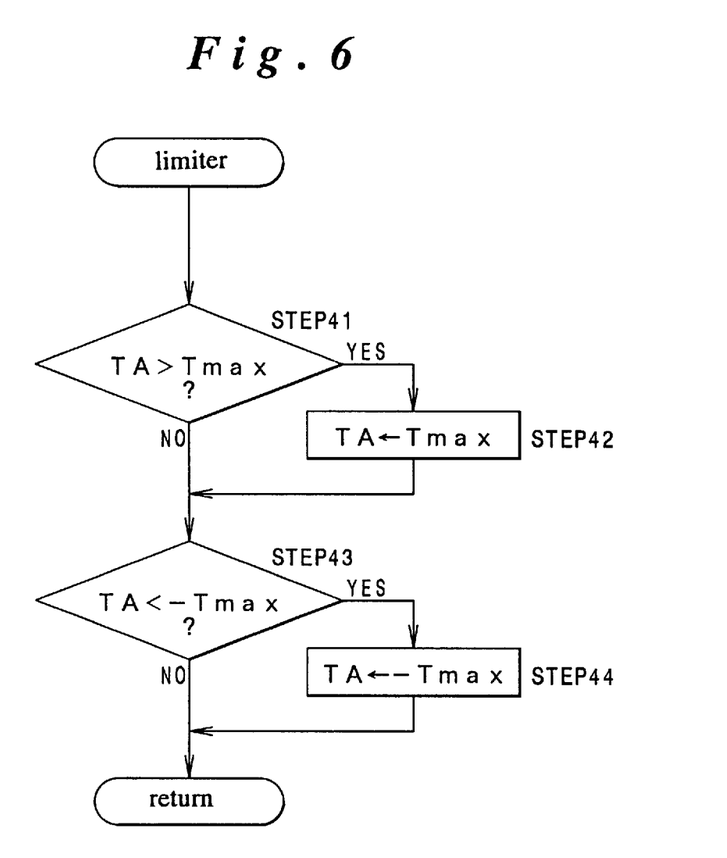
FIG. 6 is a flow chart showing step 3 of FIG. 3 in more detail.
Figure 7:
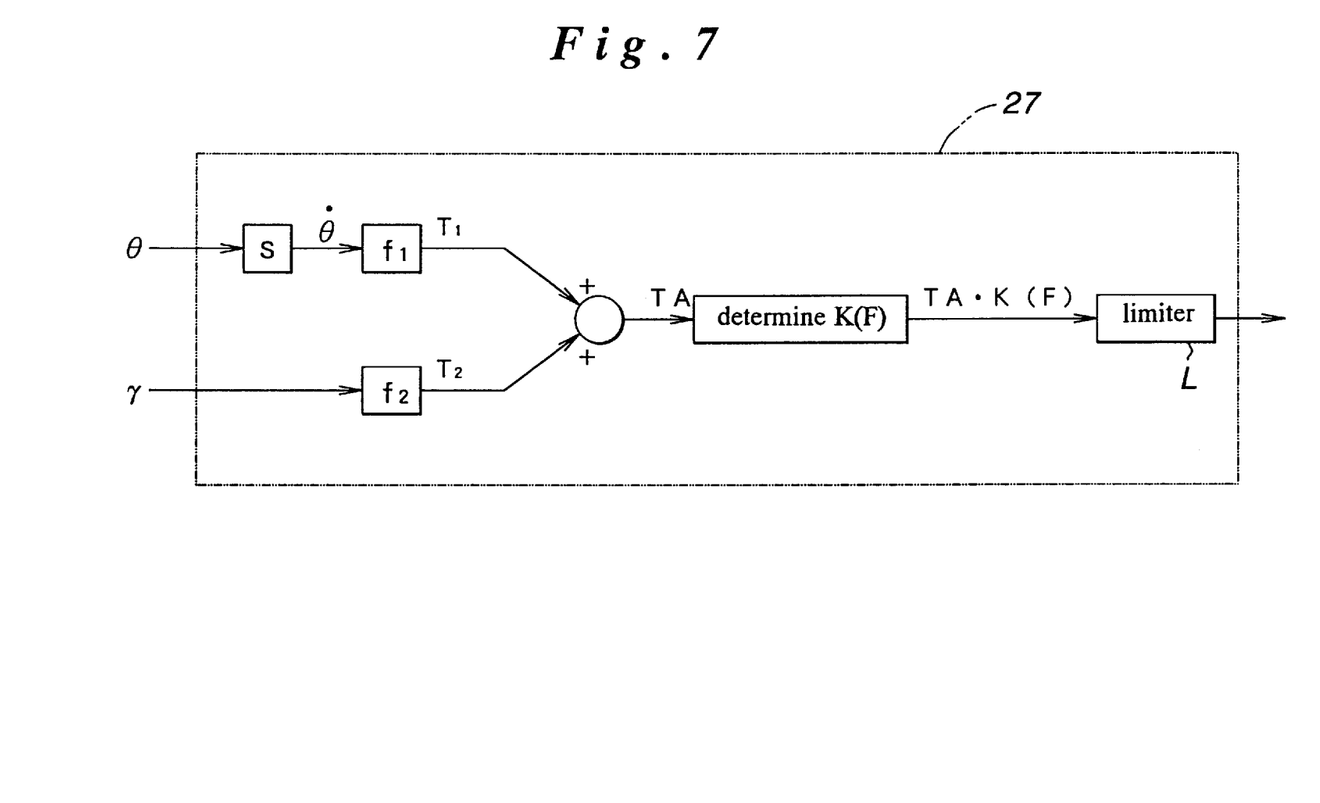
FIG. 7 is a block diagram showing the active steering reaction computing unit 27 of FIG. 2 in more detail.
Figure 8:
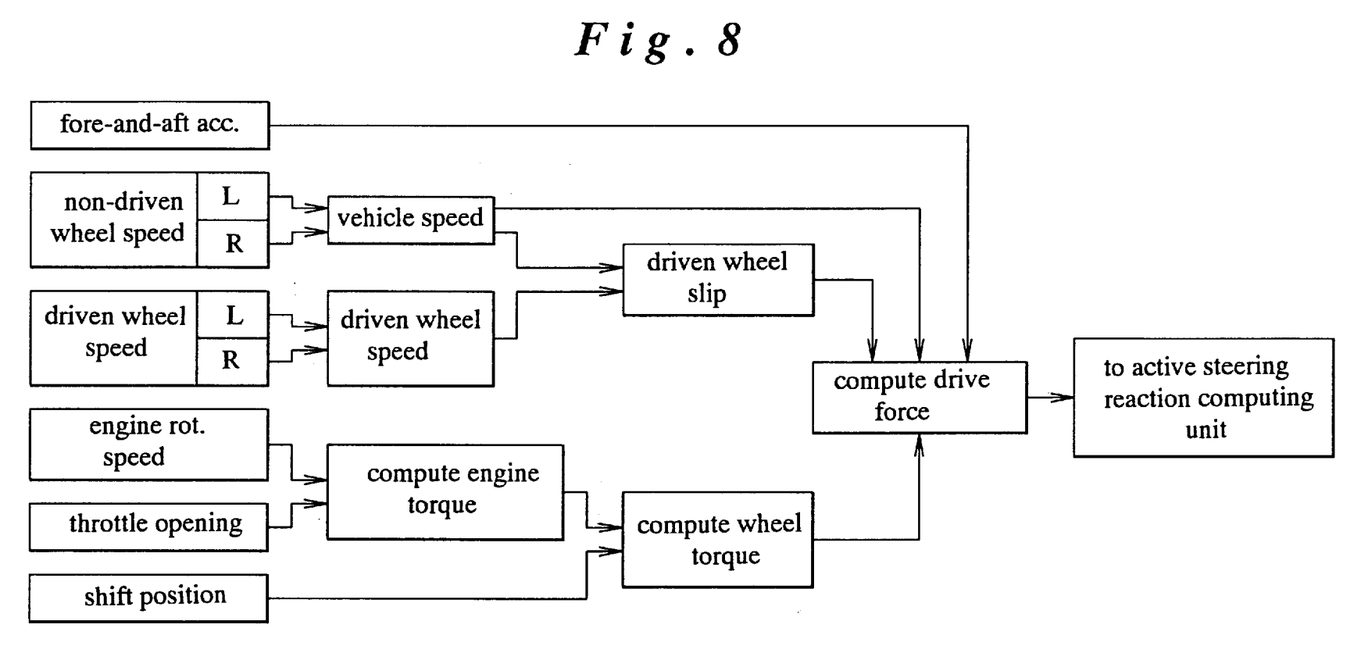
FIG. 8 is a block diagram illustrating the mode of computing the drive force F.

Step 3 is carried out as shown in FIG. 6. This process corresponds to the action of the limiter L in FIG. 7. First of all, it is determined whether the target steering reaction TA has exceeded a prescribed level Tmax (step 41), and if that is the case, the target steering reaction TA is set at the prescribed maximum level Tmax (step 42). If the target steering reaction TA is lower than this prescribed level Tmax, it is likewise determined whether the target steering reaction TA has fallen below another prescribed level −Tmax (step 43). If the target steering reaction TA is lower than this prescribed level −Tmax, the target steering reaction TA is set at the prescribed minimum level −Tmax (step 44).

The target steering reaction TA thus determined is added to the target assisting actuating torque, and the sum is converted into a target electric current level by the output current determining unit 29 to be supplied to the drive circuit 25.

Thus, when the vehicle deviates from the intended straight path due to crosswind, the electric motor 10 is activated in such a manner that the yaw rate may be eliminated even in absence of any intentional efforts to turn the steering wheel 3 by the vehicle operator, or that the deviation of the vehicle from the straight path may be eliminated so that the vehicle may be brought back on the straight path. Similarly, when the vehicle travels over a rutted road or rides into pools of water formed on the road surface, the resulting external steering disturbances are offset by the action of the active steering reaction torque produced by the powered actuator, whereby the vehicle can maintain a straight course even without any effort by the vehicle operator to steer the vehicle on the straight course.

If the steerable wheels are also power driven wheels, torque steer may be produced when the vehicle starts off from a standstill or accelerates from an intermediate speed, and this may also cause the vehicle to deviate from a straight course. A relatively large steering reaction torque is necessary to offset or cancel such a tendency of the vehicle. According to the present invention, a drive force F is computed in the drive force computing unit 28, and the target steering reaction TA is multiplied by a correction coefficient K(F), which may be defined as a mathematical function of the drive force F, so that the parameter gain or the sensitivity of the target steering reaction to the yaw rate may be increased when the vehicle is operating under a condition in which the steerable wheels or the power driven wheels are producing a driving force or a traction exceeding a certain level, and a torque steer is expected to be produced. Thus, according to the present invention, the steering control system is made capable of controlling a torque steer without compromising the capability of the system to produce a steering reaction torque suitable for controlling the behavior of the vehicle against external steering disturbances.

Thus, according to the present invention, the generation of a torque steer is estimated from the drive force of the steerable wheel, and the steering reaction torque is applied to the steerable wheel so as to cancel the effect of the torque steer. Thus, the steering disturbances due to a torque steer can be avoided in all speed ranges while the manual steering effort required for maneuvering a vehicle in narrow and tortuous streets as well as parking the vehicle is favorably controlled and the irregular behavior the vehicle in high speed ranges is avoided even in the presence of external disturbances such as crosswind.

Although the present invention has been described in terms of a specific embodiment thereof, it is possible to modify and alter details thereof without departing from the spirit of the present invention. For instance, the present invention can be applied to the steering control systems disclosed in the copending patent application Ser. No. 08/122,615 and another copending U.S. patent application Ser. No. 08/525,855 filed concurrently herewith on Sep. 8, 1995 based on Japanese patent application No. 06-264593 filed Oct. 4, 1994. The scope of the invention is indicated by the appended claims rather than by the foregoing description.

What we claim is:

1. A vehicle steering control system for vehicle equipped with steerable wheels that are power driven, comprising:

manual steering torque input means for manually applying a manual steering torque to said steerable wheels;

powered steering actuator means for applying an actuating steering torque to said steerable wheels;

means for detecting a lateral dynamic condition of the vehicle;

drive force computing means for computing a drive force of said power driven steerable wheels;

control means for determining a steering reaction torque that is to be added to said actuating steering torque produced by said powered steering actuator means, according to said detected lateral dynamic condition; and modifying means for modifying said steering reaction torque that is determined by said control means according to said drive force computed by said drive force computing means, whereby a torque steer produced in said vehicle by said drive force of said power driven steerable wheels is controlled by said steering reaction torque which is determined by said control means and modified by said modifying means.

2. A vehicle steering control system according to claim 1, wherein said actuating steering torque comprises an assist steering torque which is substantially proportional to said manual steering torque, and said steering reaction torque is substantially proportional to an actual yaw rate detected by said detecting means, said steering reaction torque being directed to cancel said detected actual yaw rate.

3. A vehicle steering control system according to claim 2, wherein said steering reaction torque is a sum of a first term which is substantially proportional to an actual yaw rate detected by said detecting means, and a second term which is substantially proportional to a steering speed, said steering reaction torque being directed to oppose the turning of a steering wheel.

4. A vehicle steering control system according to claim 1, wherein drive force computing means computes said drive force based on at least one of vehicle speed, vehicle fore-and-aft acceleration, driven wheel slip and wheel torque.

5. A vehicle steering control system according to claim 1, wherein said steering reaction torque is a sum of a first term which is substantially proportional to an actual yaw rate detected by said detecting means and a second term which is substantially proportional to a steering speed, said steering reaction torque being directed to oppose the turning of a steering wheel.

6. A vehicle steering control system for a vehicle equipped with steerable wheels that are power driven, comprising:

manual steering torque input means for manually applying a manual steering torque to said steerable wheels;

powered steering actuator means for applying an actuating steering torque to said steerable wheels;

means for detecting a lateral dynamic condition of the vehicle;

drive force computing means for computing a drive force of said power driven steerable wheels;

control means for determining a steering reaction torque that is to be added to said actuating steering torque produced by said powered steering actuator means, according to said detected lateral dynamic condition of the vehicle; and modifying means for modifying said steering reaction torque that is determined by said control means according to said drive force computed by said drive force computing means, whereby a torque steer produced in said vehicle by said drive force of said power driven steerable wheels is controlled by said steering reaction torque which is determined by said control means and modified by said modifying means, and said modifying means maintains said steering reaction torque determined by said control means substantially unchanged when said drive force is relative small, and amplifies said steering reaction torque determined by said control means when said drive force is relatively great.

7. A vehicle steering control system for a vehicle equipped with steerable wheels that are power driven, comprising:

manual steering torque input means for manually applying a manual steering torque to said steerable wheels;

powered steering actuator means for applying an actuating steering torque to said steerable wheels;

means for detecting a lateral dynamic condition of the vehicle;

drive force computing means for computing a drive force of said power driven steerable wheels;

control means for determining a steering reaction torque that is to be added to said actuating steering torque produced by said powered steering actuator means, according to said detected lateral dynamic condition of the vehicle; and modifying means for modifying said steering reaction torque that is determined by said control means according to said drive force computed by said drive force computing means, whereby a torque steer produced in said vehicle by said drive force of said power driven steerable wheels is controlled by said steering reaction torque which is determined by said control means and modified by said modifying means, and said modifying means maintains said steering reaction torque determined by said control means substantially unchanged when said drive force is below a predetermined value, and amplifies said steering reaction torque determined by said control means when said drive force is at least as great as said predetermined value.

8. A vehicle steering control system for a vehicle equipped with steerable wheels that are power driven, comprising:

manual steering torque input means for manually applying a manual steering torque to said steerable wheels;

powered steering actuator means for applying an actuating steering torque to said steerable wheels;

means for detecting a lateral dynamic condition of the vehicle;

drive force computing means for computing a drive force of said power driven steerable wheels;

control means for determining a steering reaction torque that is to be added to said actuating torque produced by said powered steering actuator means, according to said detected lateral dynamic condition; and modifying means for modifying said steering reaction torque that is determined by said control means according to said drive force computed by said drive force computing means so that the modified steering reaction torque controls torque steer of the vehicle.

9. A vehicle steering control system according to claim 8, wherein said actuating steering torque comprises an assist steering torque which is substantially proportional to said manual steering torque, and said steering reaction torque is substantially proportional to an actual yaw rate detected by said yaw rate sensor, said steering reaction torque being directed to also cancel said detected actual yaw rate.

* * * * *

UNITED STATES PATENT AND TRADEMARK OFFICE
CERTIFICATE OF CORRECTION

PATENT NO. : 5,845,222
DATED : 01 December 1998
INVENTOR(S) : Yorihisa Yamamoto, Yutaka Nishi, Takashi Nishimori, Hiroyuki Tokunaga, Hideki Machino It is certified that error appears in the above-identified patent and that said Letters Patent is hereby corrected as shown below:

Column 6, line 11, after "behavior" insert --of--;
    line 21, change "08/525,855" to --08/525,844--;
    line 22, change "06-264593" to --06-264592--;
    27th line, after "for" insert --a--.

Column 7, line numbered approximately 38 (36th printed line), change "relative" to --relatively--.

Signed and Sealed this

Thirtieth Day of March, 1999

Attest:

Q. TODD DICKINSON

*Attesting Officer*    *Acting Commissioner of Patents and Trademarks*